US011243788B1

(12) United States Patent
Palaniappan et al.

(10) Patent No.: US 11,243,788 B1
(45) Date of Patent: Feb. 8, 2022

(54) COGNITIVE TRACKING AND NAVIGATION TRAINING SYSTEM FOR IMPROVED APPLICATION PERFORMANCE (71) Applicant: BANK OF AMERICA CORPORATION, Charlotte, NC (US)

(72) Inventors: Lakshmanan Palaniappan, Chennai (IN); Virgil Arputharaj, Chennai (IN); Venugopal Purushothaman, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/060,174

(22) Filed: Oct. 1, 2020

(51) Int. Cl.
*G06F 11/34* (2006.01)
*G06F 9/451* (2018.01)
*G06F 8/77* (2018.01)
*G06F 21/31* (2013.01)

(52) U.S. Cl.
CPC ............. *G06F 9/453* (2018.02); *G06F 8/77* (2013.01); *G06F 11/3438* (2013.01); *G06F 21/31* (2013.01)

(58) Field of Classification Search
CPC ....................................................... G06F 8/77
See application file for complete search history.

(56) References Cited

U.S. PATENT DOCUMENTS

| 5,560,011 | A | 9/1996 | Uyama |
| 5,602,982 | A | 2/1997 | Judd et al. |
| 5,724,262 | A | 3/1998 | Ghahramani |
| 5,813,863 | A | 9/1998 | Sloane et al. |
| 6,086,381 | A | 7/2000 | Downs et al. |
| 6,164,975 | A | 12/2000 | Weingarden et al. |
| 6,347,943 | B1 | 2/2002 | Fields et al. |
| 6,498,920 | B1 | 12/2002 | Simon |
| 6,587,668 | B1 | 7/2003 | Miller et al. |
| 6,589,055 | B2 | 7/2003 | Osborne et al. |
| 6,882,825 | B2 | 4/2005 | Hopkins et al. |
| 6,944,624 | B2 | 9/2005 | Orton et al. |
| 7,233,971 | B1 | 6/2007 | Levy |
| 7,533,369 | B2 | 5/2009 | Sundararajan et al. |
| 8,467,715 | B2 | 6/2013 | Morita et al. |
| 8,636,515 | B2 | 1/2014 | Burgin et al. |
| 8,892,895 | B1 | 11/2014 | Chesley et al. |
| 9,009,085 | B2 | 4/2015 | Boyle et al. |
| 10,437,884 | B2 | 10/2019 | Mital et al. |
| 10,726,095 | B1 * | 7/2020 | Pallemulle .......... G06F 16/9535 |
| 2002/0093537 | A1 | 7/2002 | Bocioned et al. |
| 2010/0185579 | A1 * | 7/2010 | Hong ................. G06N 5/04 706/52 |
| 2014/0024009 | A1 | 1/2014 | Nealon et al. |
| 2014/0109168 | A1 | 4/2014 | Ashley et al. |

(Continued)

*Primary Examiner* — Di Xiao
(74) *Attorney, Agent, or Firm* — Moore & Van Allen PLLC; Nicholas C. Russell (57) ABSTRACT

Embodiments of the present invention are directed to a cognitive tracking and navigation training system for improved application performance. Embodiments of the invention are configured to operate on complex enterprise application systems where a plurality of navigation paths are available to users based on one or more assigned user roles. The present system provides an enhanced application performance by cognitively tracking and providing updated user navigation paths while a user accesses an enterprise application system.

17 Claims, 4 Drawing Sheets

(56) References Cited

U.S. PATENT DOCUMENTS

| | | |
|---|---|---|
| 2015/0332143 A1 | 11/2015 | Saini et al. |
| 2019/0080251 A1* | 3/2019 | Shyamal .................. G06N 5/04 |
| 2020/0249826 A1* | 8/2020 | Mergerian ............. G16H 40/60 |
| 2021/0034996 A1* | 2/2021 | Imai ....................... G06N 7/005 |

* cited by examiner

COGNITIVE TRACKING AND NAVIGATION TRAINING SYSTEM FOR IMPROVED APPLICATION PERFORMANCE

FIELD OF THE INVENTION

The present disclosure embraces a system, computer program product, and computer-implemented system and method for cognitive tracking and navigation training to improve application performance.

BACKGROUND

Modern enterprise application systems feature complex navigation paths based on a number of different potential roles for any given user. Accordingly, user navigation paths are often inefficient and may not be individually suited for a particular user's role within the enterprise application system. Therefore, a need exists for a cognitive tracking and navigation training system to improve application performance in an enterprise application system.

BRIEF SUMMARY OF THE INVENTION

The following presents a simplified summary of one or more embodiments of the invention in order to provide a basic understanding of such embodiments. This summary is not an extensive overview of all embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention relate to systems, computer program products, and methods for cognitive tracking and navigation training to improve application performance. Embodiments of the present invention comprise one or more processor components, one or more memory components operatively coupled to the one or more processor components, and computer-readable instructions stored on the one or more memory components configured to receive a request from a user to access an application; identify one or more user roles associated with the user; calculate an expected usage metric based on the one or more roles associated with the user; capture a user navigation path associated with the request from the user to access the application; calculate an actual usage metric based on the captured navigation path; determine the difference between the actual usage metric and the expected usage metric; and generate an updated user navigation path.

Further or alternative embodiments of the invention may be configured to prompt the user to take one or more actions based on the updated user navigation path. In some embodiments, prompting the user to take one or more actions based on the updated user navigation path may further comprise highlighting or pointing to one or more actions on a graphical user interface of the user.

In further or alternative embodiments of the invention, determining the difference between the actual usage metric and the expected usage metric further comprises calculating an entropy value based on the actual usage metric and the expected usage metric. In some embodiments, calculating an entropy value is performed by using Shannon's entropy formula.

In further or alternative embodiments of the invention, the expected usage metric is one of a usage statistic, a cumulative number of user actions, an elapsed time value.

In still further or alternative embodiments of the invention, the request from a user to access the application comprises the user inputting login credentials through a user computing system.

BRIEF DESCRIPTION OF THE DRAWINGS

Having thus described embodiments of the invention in general terms, reference will now be made the accompanying drawings, wherein:

DETAILED SUMMARY OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like.

"Entity system" as used herein may refer to the computing systems and/or other resources used by the entity to execute distributed computer and non-computer functions.

"User" as used herein may refer to an individual who may interact with the entity system. Accordingly, the user may be an employee, associate, contractor, or other authorized party who may access, use, administrate, maintain, and/or manage the computing systems within the entity system.

A "user interface" is any device or software that allows a user to input information, such as commands or data, into a device, or that allows the device to output information to the user. For example, the user interface comprises a graphical user interface (GUI) or an interface to input computer-executable instructions that direct a processing device to carry out specific functions. The user interface typically employs certain input and output devices to input data received from a user second user or output data to a user. These input and output devices may comprise a display, mouse, keyboard, button, touchpad, touch screen, microphone, speaker, LED, light, joystick, switch, buzzer, bell, and/or other user input/output device for communicating with one or more users.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

"Data Storage Environment" refers to a structured repository for data storage, such as a database.

"Data Request" as used herein may refer to a function, which may be generated by user action or automatically by a computing system, to perform operations on data stored in a data storage environment. In some instances, a "data request" may comprise a "query" and be referred to herein as such. A "data request" in an exemplary embodiment as described herein comprises at least an operator (e.g., SELECT, WHERE, FROM, etc.), a "predicate" (i.e., the string following the operator), and a "literal" (i.e., the value upon which the operations will be compared). A query predicate literal can be either a value or a parameterized variable.

"Enterprise application system" as used herein may refer to one or more software applications capable of processing a variety of user workflows depending on the role of the user and the desired output of the user.

"Resource" as used herein may refer an object which is typically transferred between the third party and the entity. The object may be tangible or intangible objects such as computing resources, data files, documents, funds, and the like.

Embodiments of the present disclosure provide a system, computer program product, and method for cognitive tracking and navigation training to improve application performance. In particular, the system may be configured to identify potential user navigation paths of a user of an enterprise application system based on assigned roles of the user and an expected navigation path of the same. The system can further provide graphical output to "train" the user in such a way as to improve the efficiency of user navigation paths based on the assigned role of the user.

In general, the system according to embodiments of the present invention implements machine learning and artificial intelligence algorithms to analyze a user's navigation path within an enterprise application system and direct a user based on an identified navigation path to improve both the user experience and application performance.

Figure 1:
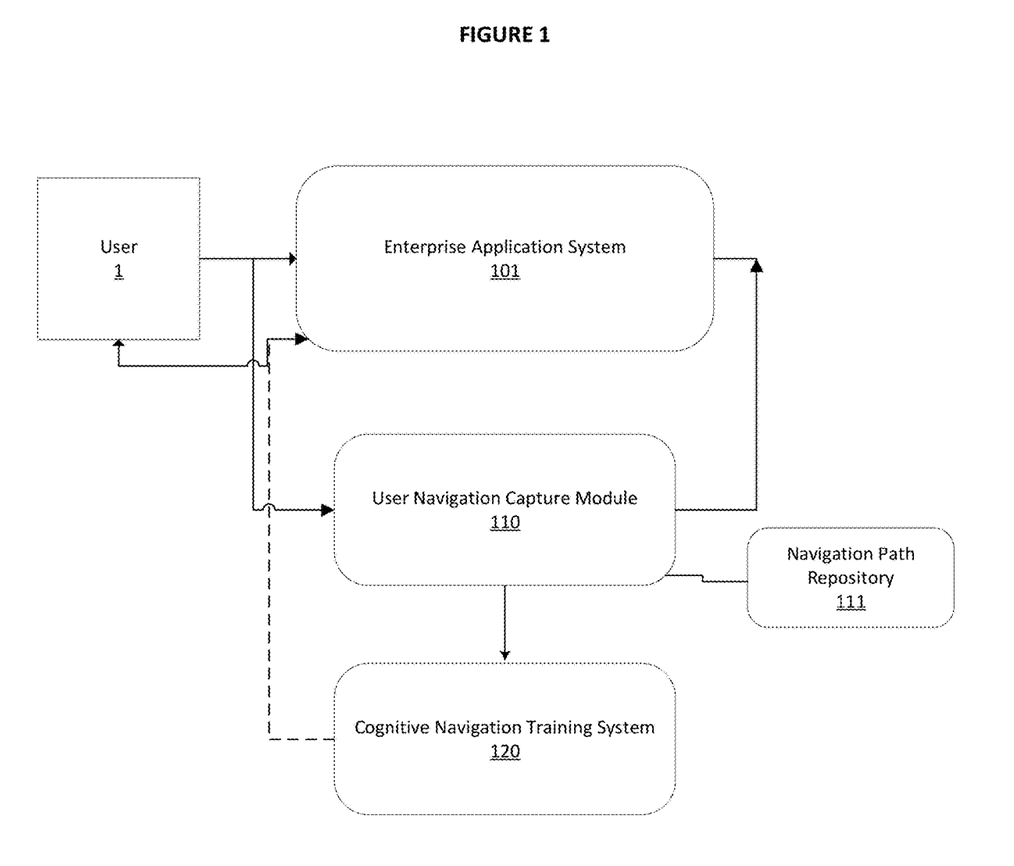
FIG. 1 is a system diagram depicting an exemplary embodiment of the invention.

FIG. 1 depicts an exemplary embodiment of the system in accordance with embodiments of the invention. As shown in FIG. 1, the system comprises an enterprise application system 101, a user navigation capture module 110, a navigation path repository 111, a cognitive navigation training system 120. FIG. 1 also depicts a user 1 who is able to access the and navigate through the enterprise application system 101.

As described above, the enterprise application system 101 may be any software or other computer application available for use within an entity. A plurality of users 1 within the entity may be permitted to access and use the enterprise application system 101 for any permitted purpose. The enterprise application system 101 may assign roles to each user 1 that make available a limited or directed set of functionalities available to the user within the enterprise application system 101. Indeed, certain functionalities may only be available to permissioned users such as those users who have received administrative permission to perform certain actions.

The user navigation capture module 110 is a module with the system of the present invention that is configured to capture the user navigation paths of a user 1 using the enterprise application system 101. As discussed in more detail herein, user 1 may take a plurality of potential user navigation paths based on one or more roles of the user 1. As described in more detail with respect to FIG. 2, a user 1 may only be permitted to perform a certain number of tasks in the enterprise application system 101 based on the assigned role of the user 1. Similarly, FIG. 3b depicts an exemplary user navigation path of a user 1 based on their assigned role.

The user navigation capture module 110 is also in operative communication with the navigation path repository 111. The navigation path repository 111 is a database of user navigation paths that are associated with various roles of the one or more users 1 who use the enterprise application system 101. The user navigation path repository 111 may be a relational database that stores both the user navigation paths of active users 1 and historical users. Similarly, the user navigation repository 111 may track the frequency of particular user navigation paths assigned to a particular user role. Further, the user navigation repository 111 may track where a user navigation path was restricted, such as when a particular user navigation path resulted in the user trying to perform functions not permitted by the enterprise application system 101 based on the assigned role of the user.

The user navigation capture module 110 and user navigation path repository 111 are also in operative communication with the cognitive navigation training module 120. The cognitive navigation training system is module with the system that is responsible for identifying potential user navigation paths of a user of an enterprise application system based on the assigned roles of the user and an expected navigation path of the same. The cognitive navigation training module can further provide graphical output to "train" the user in such a way as to improve the efficiency of user navigation paths based on the assigned role of the user. In this regard, once the cognitive navigation training module 120 has identified potential user navigation paths based on the user's current navigation path and an assigned role of the user 1, the cognitive navigation training module may provide graphical training to the user 1 that suggests potential user navigation paths for the user 1. The suggested potential user navigation paths may be presented within a graphical user interface on the user computing device. In this regard, the system may highlight or point to specific functions within the enterprise application system 101 where the user navigation path is likely to lead. For example, as shown in FIG. 3b, when a user with the assigned role reaches the step on the user navigation path labeled "submit for pending approval", the user navigation capture module 110 may perform cognitive analysis to determine that the likely next step for a user with that assigned role is next likely to "validate status". Accordingly, the cognitive navigation training module 120 may highlight or point to the "validate status" operation on the user's interface. In this sense, the user may be directed to their next operation without need to search within the interface for the desired operation. Efficiency of the enterprise application system 101 can thus be improved.

FIG. 1 also depicts a user 1 in operative communication with the enterprise application system 101. As discussed in further detail below, the user 1 may be assigned various roles within the enterprise application system 101, each of which permit different navigation paths during the use of the enterprise application system 101. The user 1 may connect to the enterprise application system via direct connection, over a network, or through any other means established by the application manager for the enterprise application system 101.

Figure 2:
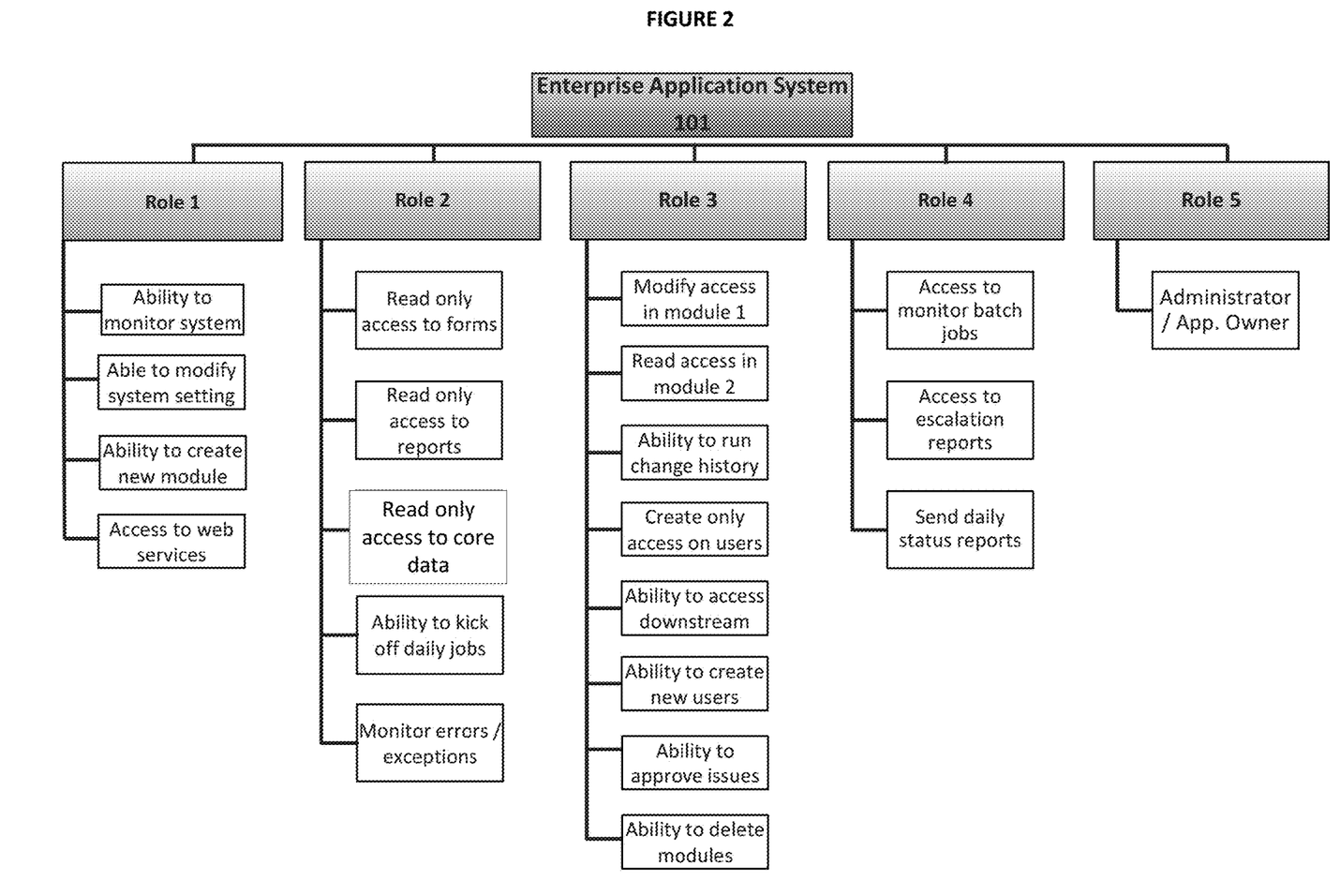
FIG. 2 is a diagram depicting application permissions and roles in an enterprise application system according to embodiments of the invention.

FIG. 2 is a diagram depicting application permissions and roles in an enterprise application system according to embodiments of the invention. As shown in FIG. 2, an exemplary enterprise application system 101 may have a number of roles associated with a plurality of users 1 who access and use the enterprise application system 101. For example, the enterprise application system 101 shown in FIG. 2 has five separate roles assigned with the enterprise application system, shown as Role 1, Role 2, Role 3, Role 4 and Role 5. Each role is entitled to perform different functions within the enterprise application system 101, as described below.

Role 1 in the exemplary enterprise application system 101 shown in FIG. 2 is permitted to perform the functions shown under their respective heading—system monitoring ability, modification to system settings, creation of new modules, and access to web services.

Role 2 as shown in FIG. 2 has additional functionality assigned to such role; however some functionality may be more restrictive than those described with respect to Role 1. For example, Role 2 is only permitted to access forms, reports and core data on a read only basis. Role 2 may also kick off daily jobs and monitor errors and exceptions.

Role 3 has a wide range of functionality in the exemplary embodiment depicted in FIG. 2, including modify access to a first module, read only access to a second module, ability to run change history, create access to users, ability to access downstream functionality, ability to create new users, approval ability on issues, and the ability to delete modules.

Role 4 as depicted in the exemplary embodiment of FIG. 2 has the ability to access to monitor batch jobs, access to escalation reports, and send daily status reports.

Role 5 as shown in Figure is assigned as an Administrator and/or application owner. As will be understood, the exemplary embodiment described in FIG. 2 sets forth only a subset of tasks, jobs, responsibilities, and the like for a particular enterprise application system 101. Alternative enterprise application systems 101 in accordance with embodiments of the present invention may have additional and/or less roles available, or different functionality assigned to each role. In addition, certain functionality may be available to users 1 having a multitude of roles, such as the ability to access modules. Further, it should be understood that a user 1 may be assigned a plurality of roles when they access the enterprise application system 101, such that the functionality of each role will be available to the user 1.

Figure 3A:
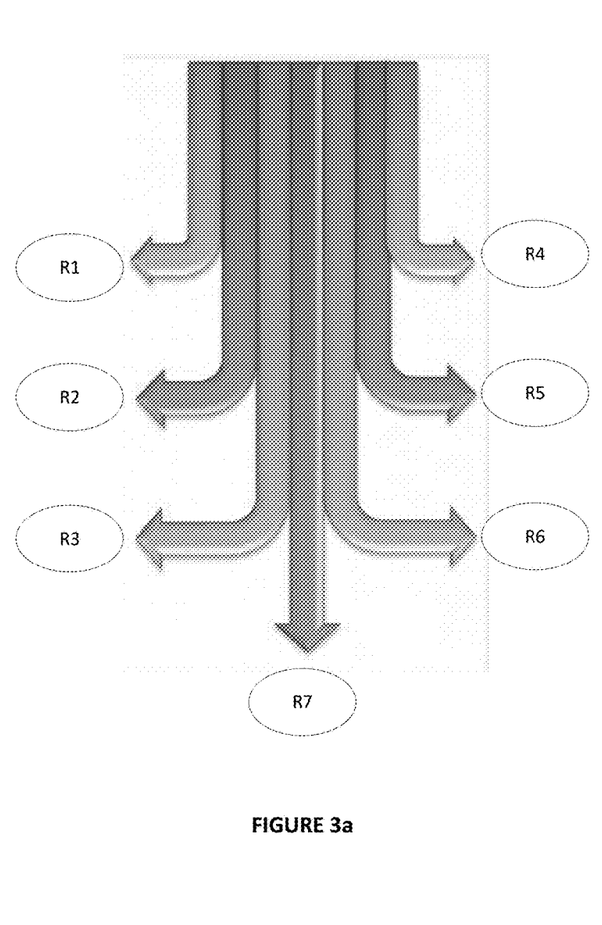
FIG. 3a is an exemplary user navigation path for a plurality of users of an enterprise application system according to embodiments of the present invention.
Figure 3B:
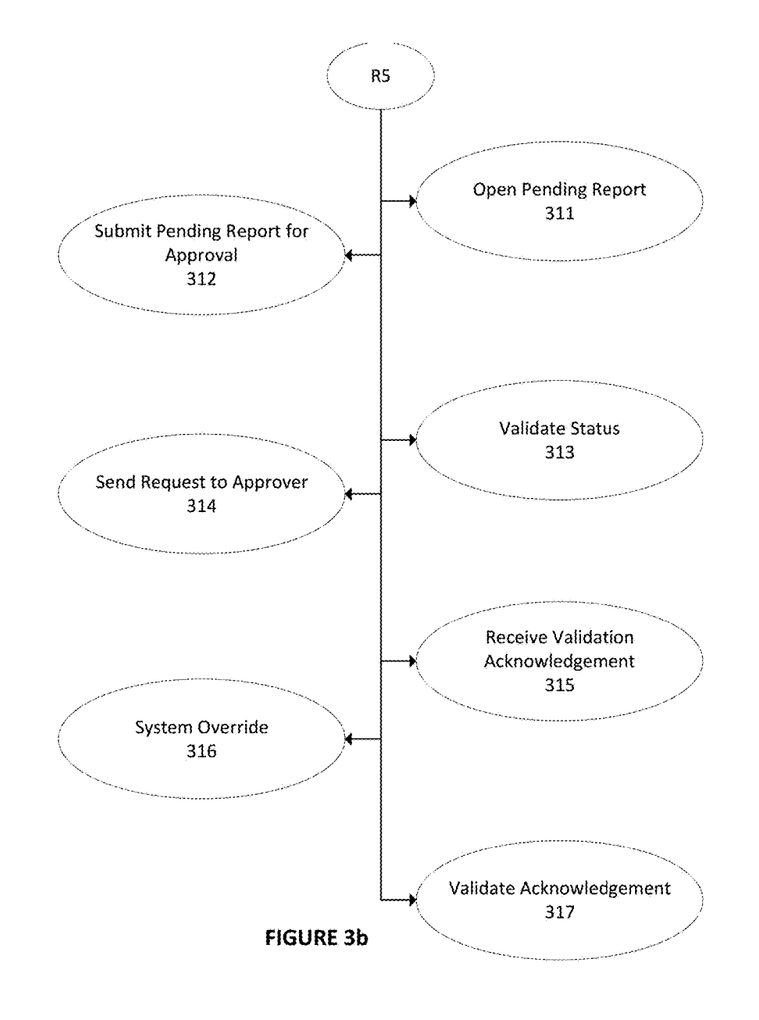
FIG. 3b is a detailed navigation path of a single user of an enterprise application system according to embodiments of the present invention.

FIG. 3a is an exemplary user navigation path for a plurality of users of an enterprise application system according to embodiments of the present invention. As depicted in FIG. 3, each role (R1, R2, R3, R4, R5, R6, and R7) have diverging paths shown, with each being able to navigate through the enterprise application system 101 according to their respective roles and the associated functionality available, such as functionality described above with respect to FIG. 2.

FIG. 3b is a detailed navigation path of a single user of an enterprise application system according to embodiments of the present invention. As shown in FIG. 3b, a user 1 is assigned the role of R7. The user's navigation path through the enterprise application system 101 begins at block 311, where the user opens a pending report in the enterprise application system 101. At block 312, where the user 1 submits a pending report for approval. This step may require the user to submit the pending report to a different user having approval privileges in accordance with their respective role in the enterprise application system 101.

At block 313, the user 1 has to validate their status following the submission of the pending report for approval. Status validation may be triggered automatically once the report is submitted, or may be triggered by an action from the role responsible for approving the pending report.

After the status has been validated, at block 314, the user 1 sends a request to the approver to approve the pending approval. At block 315, the user 1 receives acknowledgement of the validation submitted at block 313.

At block 316, the system overrides the user 1 action, based on an identification that the user 1 has taken an incorrect navigation path based on the process flow. This identification process is described in greater detail with respect to FIG. 4 below. It should be understood that the system override may require the user to 1 to continue on the appropriate navigation path given the assigned user role.

At block 317, the user navigation path is restored to receiving the validation acknowledgement similar to as described above with respect to block 315. Here, the user 1 can either exit the enterprise application system 101 or begin a new user navigation path in accordance with the one or more assigned roles for that user 1.

Figure 4:
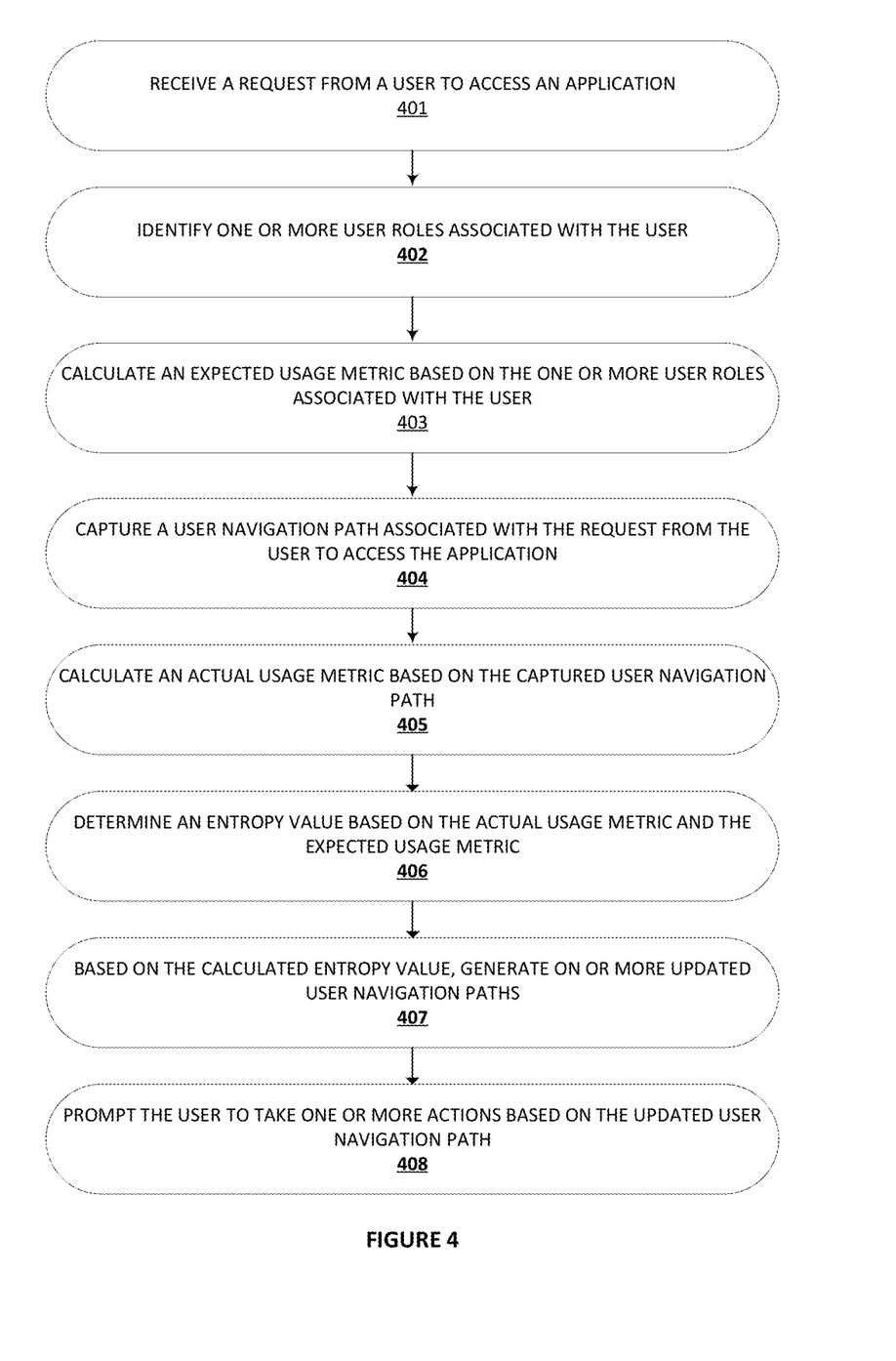
FIG. 4 is a flow chart depicting an exemplary process flow according to embodiments of the invention.

FIG. 4 is a flow chart depicting an exemplary process flow according to embodiments of the invention. As shown in FIG. 4, the process beings at block 401, where the system receives a request from a user to access an application. The request from the user 1 may occur when the user logs on to the user application system 100 by inputting login credentials to a user computing device. In some embodiments, the user may application the user application system 100 by going to a URL or other web address in order to access an application that is hosted on a different system.

At block 402, the system identifies one or more user roles associated with the user. As discussed above with respect to FIGS. 1-3, the enterprise application system may have a number of predefined roles for different users 1 that restrict or provide access to certain functionality within the enterprise application system 101. In addition, as noted above, a user 1 may have more than one role within the enterprise application system 101. For example, a user could have both administrative and user roles. The system may identify all applicable roles for a given user 1. The system may use each role or the combination of roles to help determine an expected user navigation path for the particular user 1.

At block 403, the system calculates an expected usage metric based on the one or more user roles associated with the user 1. The expected usage metric may be any metric for evaluating a user navigation path, such as a usage statistic, a number of actions, an elapsed time value, or any other similar metric. The expected usage metric may be based on the identified user role or user roles for the user 1. The expected usage metric may further be calculated as an average or other meaningful statistic of other users with similar or identical roles within the enterprise application system 101.

At block 404, the system captures a user navigation path associated with the request from the user to access the application. The user navigation capture module 110 is responsible for calculating the user navigation path once the user has accessed the enterprise application system 101. In this regard, the user navigation capture module 110 may capture and log each user action in the navigation path repository 111.

At block 405, the system calculates an actual usage metric based on the captured user navigation path. The actual usage metric should be a comparable metric to the expected usage metric determined at block 403. In this sense, the system will be able to compare the actual usage metrics against the expected usage metrics in order to determine whether the user 1 is making an efficient and/or desirable user navigation path through the enterprise application system 101.

At block 406, the system determines an entropy value based on the actual usage metric and the expected usage metric, wherein the entropy value represents an information loss between the expected user navigation path and the actual user navigation path. The resulting change in entropy can then be used to estimate the information loss that will result from the user navigation path deviating from the expected user navigation path. As used herein, entropy means the similarity and dispersion of the data associated with the expected user navigation path and the actual user navigation path. Exemplary embodiments of the present invention use Shannon's entropy formula, set forth as follows:

$$S = -\Sigma_i P_i \log P_i, \text{where } P_i \text{ is the probability of each possible outcome } i.$$

At block 407, based on the entropy value determined in the preceding step, the system may generate one or more updated user navigation paths. The one or more updated user navigation paths should be determined by the system in order to direct the user 1 back to the expected user navigation path. In this sense, the updated user navigation path may comprise one or more user actions in order to return the user to the expected navigation path.

Lastly, at block 408, the system may prompt the user to take on or more actions based on the updated user navigation path. As described above, the system may prompt the user by may highlight or point to specific functions within the enterprise application system 101 where the updated user navigation path requires user action.

As will be appreciated by one of ordinary skill in the art, the present invention may be embodied as an apparatus (including, for example, a system, a machine, a device, a computer program product, and/or the like), as a method (including, for example, a computer-implemented process), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with software-defined radio systems and machine learning algorithms to be performed thereon.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broader invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A cognitive tracking and navigation training system for improved application performance, the system comprising:
    one or more processor components;
    one or more memory components operatively coupled to the one or more processor components;
    computer-readable instructions stored on the one or more memory components and configured to cause the one or more processor components to:
        receive a request from a user to access an application;
        identify one or more user roles associated with the user, wherein the one or more roles;
        calculate an expected usage metric based on the one or more roles associated with the user, wherein the expected usage metric comprises at least an average of other users with an identical role as the one or more roles associated with the user;
        capture a user navigation path associated with the request from the user to access the application;
        calculate an actual usage metric based on the captured navigation path;
        determine a difference between the actual usage metric and the expected usage metric, wherein determining the difference between the actual usage metric and the expected usage metric comprises calculating an entropy value based on the actual usage metric and the expected usage metric; and
        generate an updated user navigation path.

2. The system of claim 1, wherein the system is further configured to prompt the user to take one or more actions based on the updated user navigation path.

3. The system of claim 1 wherein calculating the entropy value is performed by using Shannon's entropy formula.

4. The system of claim 1, wherein the expected usage metric is one of a usage statistic, a cumulative number of user actions, an elapsed time value.

5. The system of claim 2, wherein prompting the user to take one or more actions based on the updated user navigation path comprises highlighting the one or more actions on a graphical user interface.

6. The system of claim 1, wherein the request from the user to access the application comprises the user inputting login credentials through a user computing system.

7. A computer program product for cognitive tracking and navigation training to improve application performance, the computer program product comprising at least one non-transitory computer readable medium comprising computer readable instructions, the instructions comprising instructions to:
    receive a request from a user to access an application;
    identify one or more user roles associated with the user;
    calculate an expected usage metric based on the one or more roles associated with the user, wherein the expected usage metric comprises at least an average of other users with an identical role as the one or more roles associated with the user;
    capture a user navigation path associated with the request from the user to access the application;
    calculate an actual usage metric based on the captured navigation path;
    determine a difference between the actual usage metric and the expected usage metric, wherein determining the difference between the actual usage metric and the expected usage metric comprises calculating an entropy value based on the actual usage metric and the expected usage metric; and
    generate an updated user navigation path.

8. The computer program product of claim 7, wherein the computer program product is further configured to prompt the user to take one or more actions based on the updated user navigation path.

9. The Computer program product of claim 7, wherein calculating the entropy value is performed by using Shannon's entropy formula.

10. The Computer program product of claim 7, wherein the expected usage metric is one of a usage statistic, a cumulative number of user actions, an elapsed time value.

11. The Computer program product of claim 8, wherein prompting the user to take one or more actions based on the updated user navigation path comprises highlighting the one or more actions on a graphical user interface.

12. The Computer program product of claim 7, wherein the request from the user to access the application comprises the user inputting login credentials through a user computing system.

13. A computer implemented method for cognitive tracking and navigation training to improve application performance, the method comprising:
    receive a request from a user to access an application;
    identify one or more user roles associated with the user;
    calculate an expected usage metric based on the one or more roles associated with the user, wherein the expected usage metric comprises at least an average of other users with an identical role as the one or more roles associated with the user;
    capture a user navigation path associated with the request from the user to access the application;
    calculate an actual usage metric based on the captured navigation path;
    determine a difference between the actual usage metric and the expected usage metric, wherein determining the difference between the actual usage metric and the expected usage metric comprises calculating an entropy value based on the actual usage metric and the expected usage metric; and generate an updated user navigation path.

14. The computer-implemented method of claim 13, wherein the method further comprises prompt the user to take one or more actions based on the updated user navigation path.

15. The computer-implemented method of claim 13, wherein calculating the entropy value is performed by using Shannon's entropy formula.

16. The computer-implemented method of claim 13, wherein the expected usage metric is one of a usage statistic, a cumulative number of user actions, an elapsed time value.

17. The computer-implemented method of claim 14, wherein prompting the user to take one or more actions based on the updated user navigation path comprises highlighting the one or more actions on a graphical user interface.

* * * * *